Figure 1:
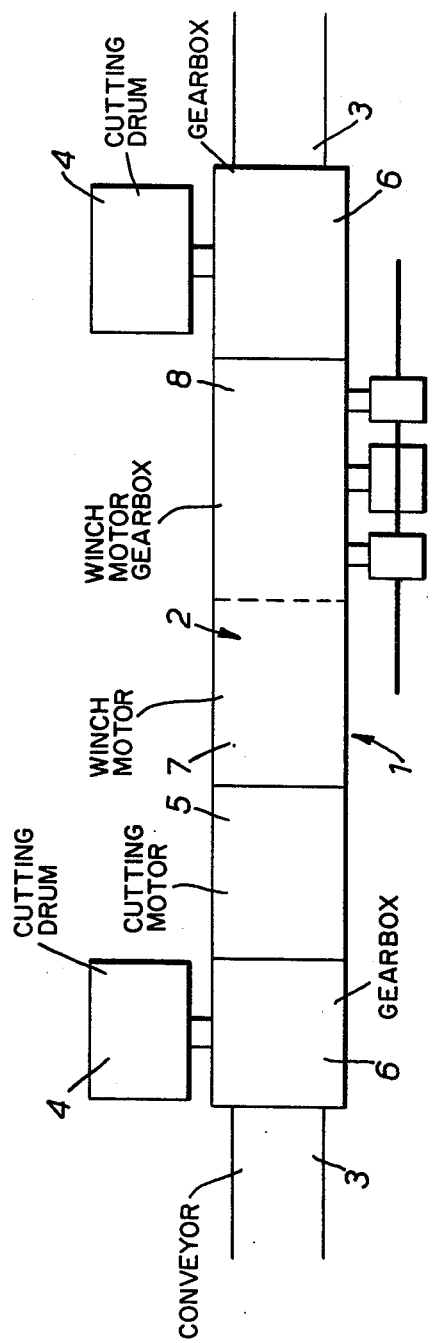

United States Patent [19]

Greenhough

[11] 4,140,951

[45] Feb. 20, 1979

[54] MINING MACHINE

[75] Inventor: Paul Greenhough, Cleck Heaton, England

[73] Assignee: Dresser Europe S.A., Brussels, Belgium

[21] Appl. No.: 833,671

[22] Filed: Sep. 15, 1977

[30] Foreign Application Priority Data

Sep. 23, 1976 [GB] United Kingdom ............... 39582/76

[51] Int. Cl.² .............................................. H02P 7/62
[52] U.S. Cl. .................................................. 318/822
[58] Field of Search ............... 318/239, 238, 241, 240, 318/237

[56] References Cited

U.S. PATENT DOCUMENTS 3,657,622  4/1972  Reuland et al. ...................... 318/240

FOREIGN PATENT DOCUMENTS 1087518 10/1967 United Kingdom ............. 307/240 UX Primary Examiner—Herman J. Hohauser
Attorney, Agent, or Firm—Larson, Taylor & Hinds

[57] ABSTRACT

A mining machine includes drive unit means for driving a haulage winch and a cutting tool of the machine, the drive unit means comprising a multi-phase induction motor with a wound rotor. In order to control the motor speed, the motor is provided with a circuit connected across the rotor windings and means for varying the effective impedance presented by the said circuit to the rotor windings.

19 Claims, 3 Drawing Figures

MINING MACHINE

This invention relates to a mining machine.

It is common practice to drive the haulage winch of a mining machine by a fluid operated driving mechanism which usually comprises a hydraulic pump and a hydraulic motor. The pump and motor are employed so that an infinitely variable speed output can be obtained and hence the feed rate from the pump to the motor adjusted to suit changes in the hardness of the material which is being cut by the mining machine. Similarly, the rotary cutter(s) of the mining machine can be driven by such a hydraulic drive. However, hydraulic drives in use underground present difficulties as regards the risk of environmental dust at the coal face entering the hydraulic system, thereby increasing the need for maintenance.

According to the invention there is provided a mining machine including:
- drive unit means arranged to drive a haulage winch of the machine and a cutting tool of the machine, the drive unit means comprising a multi-phase induction motor with a wound rotor,
- polyphase rectifier means arranged to receive the phase outputs of the motor and to combine these phase outputs to form a single unidirectional voltage output,
- at least one branch connected to be supplied by the rectifier means, and
- means for varying the effected impedance presented by the said at least one branch to the rotor winding.

In this way, the motor speed over the full range of operating torques can be varied over the higher speed ranges up to maximum speed as well as over the lower speed ranges through which the motor passes transiently on starting up. The effective impedance presented to the rotor windings may be varied in discrete or infinitesimal steps.

Preferably, the effective impedance varying means comprises a feedback loop including control means arranged to control the effective impedance presented by the said circuit to the rotor windings in accordance with a predetermined criterion set in the control means. Alternatively, however, the effective impedance can be varied manually from a controller.

The drive unit means preferably comprises respective drive units arranged to drive the haulage winch and the cutting tool, at least one of the drive units comprising a multi-phase induction motor of the kind specified above. However, it could alternatively comprise a single drive unit arranged to drive both the winch and the cutting tool.

Figure 2:
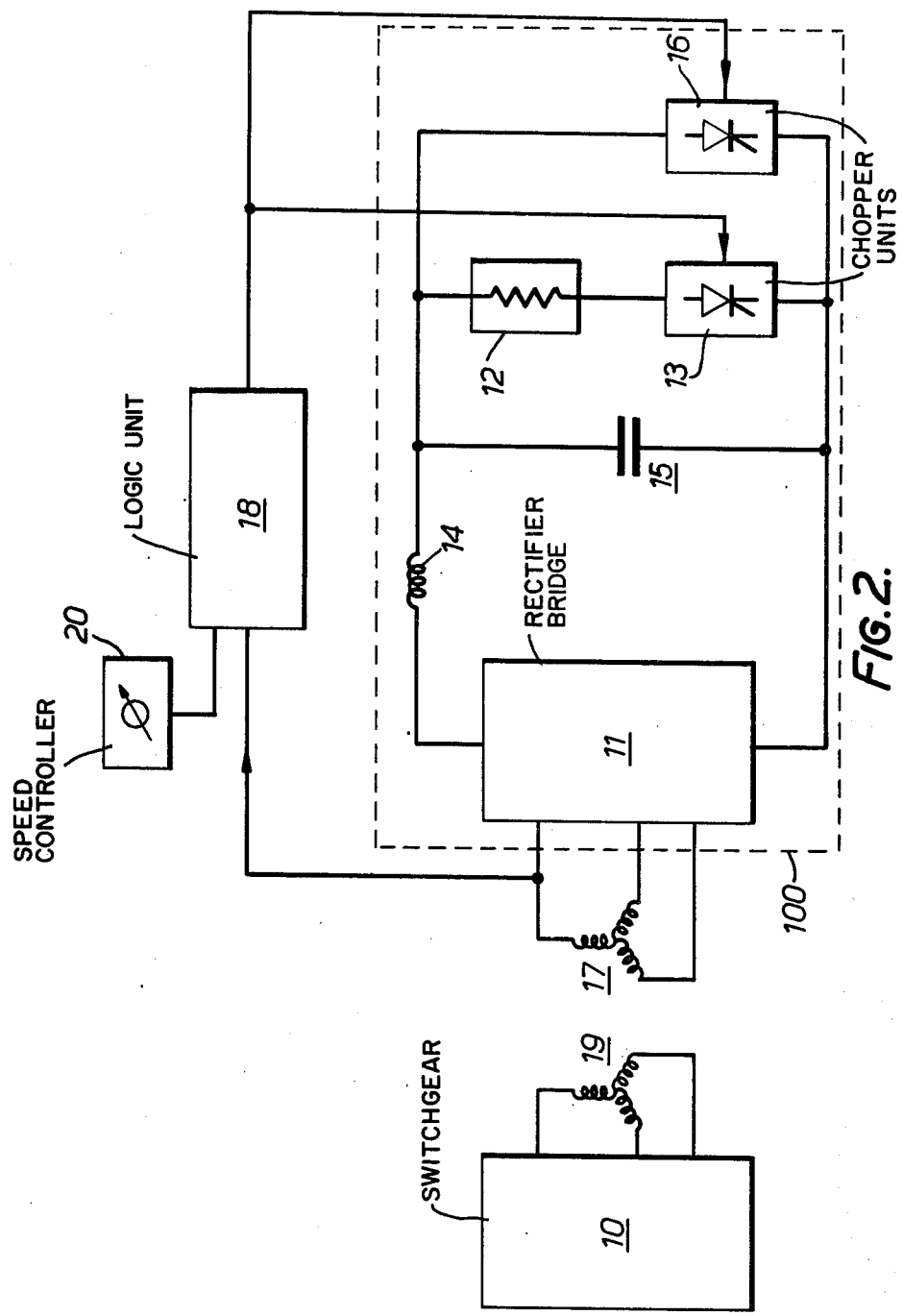
Figure 3:
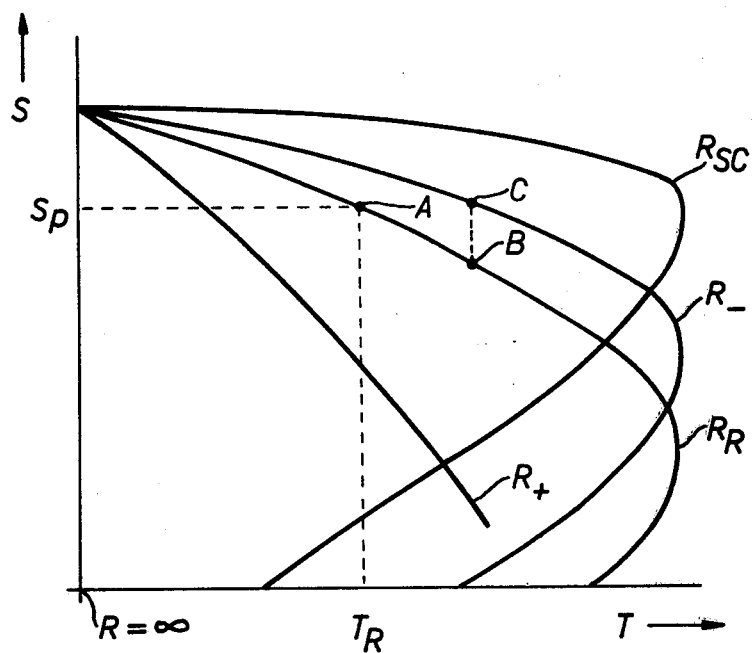

For a better understanding of the invention and to show how the same may be carried into effect, reference will now be made, by way of example, to the accompanying drawings, in which:

FIG. 1 illustrates diagrammatically a mining machine having an electric cutter motor and an electric winch motor, FIG. 2 shows, diagrammatically, a speed control circuit provided for the winch motor, and FIG. 3 is a graph of the winch motor torque speed characteristics, illustrating operation of the control circuit.

Referring to FIG. 1, a mining machine 1 comprises a body 2 mounted for movement along a face conveyor 3 and having at each end a cutting drum 4. The body 2 houses an electric cutter motor 5, driving the two drums through cutting unit gear boxes 6, and an electric winch motor 7, which by means of a winch motor gear box 8 hauls the machine along the conveyor.

With reference to FIG. 2, the winch motor is a three-phase induction motor comprising a stator winding 19, which is fed from the multiphase alternating current source via switch gear 10, and a wound rotor 17 having respective phase windings, across which is connected a circuit 100 having a three phase, full wave, rectifier bridge 11 which rectifies the rotor voltages, two parallel connected branches, one of which includes an impedance shown in the form of a resistor unit 12, and a filter consisting of an inductor 14 and a capacitor 15. Normally, the connection between the phase windings and the rectifier bridge will be by way of slip rings in order to keep the bulk of the rotor circuit (i.e. the rotor windings in combination with the circuit 100) separate from the rotor and stationary but this is not essential. The resistor unit 12 is connected in series with a direct current thyristor chopper unit 13 and the branch incorporating these two series-connected components is connected to the rectifier bridge output via the filter comprising the inductor 14 and the capacitor 15. A further direct current thyristor chopper unit 16 is connected in the other branch so as to be in parallel with the chopper unit 13 and resistor unit 12 in series.

The speed of the winch motor is governed by the effective impedance presented by the circuit 100 to the rotor windings, this effective impedance being controlled by a feedback branch from the wound rotor 17 comprising an overall logic unit 18. When neither thyristor is fired, the rotor winding is on open circuit. When the thyristor of chopper unit 13 is fired, the resistor unit 12 is connected into the rotor circuit which then has an effective resistance of $R_R$ (see FIG. 3). When the other thyristor alone is fired, the rotor winding 17 is on short-circuit, the effective impedance presented by the circuit 100 then being $R_{SC}$. In addition, other effective impedance values, that is $R_-$ between $R_{SC}$ and $R_R$ and $R_+$ between $R_R$ and infinite resistance can be selected by supplying square wave control pulses to one or other of the thyristors of the chopper units 13, 16, the value of $R_-$ or $R_+$ depending on the ratio of the conducting to the non-conducting times of the thyristors. In a modification only one branch with a chopper unit, and with or without an impedance, is incorporated in the circuit 100.

The feedback loop is arranged to maintain the winch motor speed to within limits of a pre-set value, set in a speed controller 20. Denoting this value by $S_p$, the motor is then operating at the point A (see FIG. 3) on the torque-speed characteristic which corresponds to the torque $T_R$ required from the motor, this characteristic corresponding to the effective resistance $R_R$. If the torque required from the motor increases the speed drops and the motor is then operating at the point B. The logic unit 18 monitors the frequency of the rotor current or voltage, or the rotor voltage, which are related to the speed of the winch rotor, and responds to the detected drop in rotor speed to adjust the effective impedance presented by the circuit 100 to the nearest possible value of $R_-$ to restore the winch motor speed to $S_f$. The motor is then at the operating point C.

It is preferred from the practical point of view to adjust the effective impedance in discrete steps but it would be possible for the logic unit 18 to be arranged to control the chopper units in such manner that the effective impedance can be varied in infinitesimal steps. In either case the effective impedance can be varied over the full operating range of the motor.

Instead of obtaining values of $R_-$ and $R_+$ by supplying square wave pulses to the thyristors, the rotor circuit could be modified by using at least one branch, and preferably several parallel-connected branches, each comprising a resistor unit and a chopper unit connected in series and each having a different resistive value for the resistor unit. The logic unit would then be arranged to fire the appropriate thyristor or combination of thyristors so as to provide the desired effective impedance. Clearly the larger the number of branches the greater is the number of discrete effective impedances which can be presented to the rotor windings.

It is preferred to arrange the control circuit such that a predetermined full-load torque cannot be exceeded. Thus, up to that torque, the motor speed can be maintained constant but when the full load torque is reached, the presented effective impedance for increasing load is varied to allow the motor speed to drop correspondingly. In another arrangement, the motor could be arranged to operate at a predetermined constant torque and to adjust its speed according to the load. Where the motor is operated at constant torque, this has the advantage that because the rotor current is then substantially constant, the heat generated in the rotor windings is constant and this simplifies the cooling requirements of the rotor.

The described speed control system could alternatively be used to control just the electric cutter motor, or even to control both the winch motor and the cutter motor.

It is to be noted that the inductor 14 and/or the capacitor 15 of the filter connected to the output of the rectifier bridge 11 may be omitted under certain circumstances. Thus, where the inductance provided by the rotor phase windings is sufficient to provide a satisfactory current rise rate characteristic for the current through the thyristors once fired, no inductor is required in the filter. Moreover, the capacitor 15 may be left out of the circuit if the current fluctuations in the rotor circuit can be tolerated.

In a modification, the feedback from the wound rotor can be by way of a tachogenerator. Moreover, whilst feedback control of the motor speed is to be preferred, it would be possible to dispense with these and to control the logic unit from a manual controller.

Advantages of the described motor speed control arrangement are that it is simple constructionally and also is unlikely to be affected by environmental dust at the coal face.

What we claim is:

1. A mining machine including:
   drive unit means for driving a haulage winch of the machine and a cutting tool of the machine, the drive unit means including a multi-phase induction motor with a wound rotor,
   polyphase rectifier means arranged to receive the phase outputs of said motor and to combine said phase outputs to form a single unidirectional voltage output,
   at least one branch connected to be supplied by the rectifier means, and
   means for varying the effective impedance presented by said at least one branch to the rotor windings.

2. A mining machine according to claim 1, wherein the effective impedance varying means comprises control means in a feedback branch for monitoring a parameter related to the performance of the drive unit means, said control means being arranged to control the said effective impedance in accordance with a predetermined criterion of drive unit performance set in the control means.

3. A mining machine according to claim 1, wherein the effective impedance varying means is manually operated.

4. A mining machine according to claim 1, wherein the effective impedance varying means comprises switch means, connected in said at least one branch of the said circuit, and control means for selectively controlling operation of the said switch means.

5. A mining machine according to claim 4, wherein said at least one branch includes an impedance.

6. A mining machine according to claim 4, wherein the control means is manually operated.

7. A mining machine according to claim 4, wherein the control means is incorporated in a feedback branch to monitor a parameter related to the performance of the drive unit means and is arranged to control operation of the switch means to satisfy a predetermined criterion of drive unit performance set in the control means.

8. A mining machine according to claim 2, wherein the criterion is that the motor speed is to remain constant within given limits.

9. A mining machine according to claim 2, wherein the criterion is that the full-load torque is not to exceed a predetermined torque, at which the motor-speed for increasing load is reduced so that said predetermined full-load torque is not exceeded.

10. A mining machine according to claim 2, wherein the criterion is that the motor speed is to remain constant within given limits up to a predetermined full-load torque, at which the motor speed for increasing load is reduced so that said predetermined full-load torque is not exceeded.

11. A mining machine according to claim 2, wherein the criterion is that the motor is to operate at a predetermined constant torque.

12. A mining machine according to claim 4, wherein the switch means, connected in said at least one branch, is in the form of a thyristor chopper unit and the control means incorporates a logic circuit arranged to supply control pulses selectively to said chopper unit.

13. A mining machine according to claim 4, wherein an inductance connected in series with said at least one branch.

14. A mining machine according to claim 4, wherein a further branch is connected in parallel with said at least one branch and comprises a capacitance.

15. A mining machine according to claim 1, wherein the polyphase rectifier means, said at least one branch and the effective impedance varying means are stationary and in connection with the rotor windings by way of slip rings.

16. A mining machine according to claim 1, wherein the induction motor is coupled to drive the said haulage winch alone.

17. A mining machine according to claim 1, wherein the induction motor is coupled to drive the said cutting tool alone.

18. A mining machine according to claim 1, wherein the induction motor is coupled to drive both the said haulage winch and the said cutting tool.

19. A mining machine according to claim 1, wherein the drive unit means comprises two multiphase induction motors with wound rotors, each said motor being provided with a respective polyphase rectifier means, with at least one respective, branch and with a respective effective impedance varying means, and the two motors being coupled to drive the said haulage winch and the said cutting tool respectively.

* * * * *